US012415501B2

(12) United States Patent
Ohsako et al.

(10) Patent No.: US 12,415,501 B2
(45) Date of Patent: Sep. 16, 2025

(54) METHOD OF CONTROLLING HYBRID VEHICLE AND CONTROL SYSTEM

(71) Applicant: Mazda Motor Corporation, Hiroshima (JP)

(72) Inventors: Masakazu Ohsako, Aki-gun (JP); Keisuke Tanaka, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 335 days.

(21) Appl. No.: 18/188,748

(22) Filed: Mar. 23, 2023

(65) Prior Publication Data
US 2023/0347874 A1 Nov. 2, 2023

(30) Foreign Application Priority Data
Apr. 28, 2022 (JP) .................. 2022-074193

(51) Int. Cl.
*B60W 10/30* (2006.01)
*B60K 6/26* (2007.10)
(Continued)

(52) U.S. Cl.
CPC .............. *B60W 20/40* (2013.01); *B60K 6/26* (2013.01); *B60K 6/387* (2013.01); *B60W 10/02* (2013.01);
(Continued)

(58) Field of Classification Search
CPC ...... B60W 20/40; B60W 10/02; B60W 10/30; B60W 30/194; B60W 2510/0208;
(Continued)

(56) References Cited

U.S. PATENT DOCUMENTS

2006/0180362 A1\* 8/2006 Yamaguchi ........... B60W 20/00
180/65.235
2015/0360673 A1 12/2015 Yoshida et al.
(Continued)

FOREIGN PATENT DOCUMENTS

CN 102529956 A \* 7/2012 ............ B60W 20/00
JP 5980436 B2 8/2016

OTHER PUBLICATIONS

European Patent Office, Extended European Search Report Issued in EP Application No. 23163894.1, Sep. 22, 2023, Munich, 9 pages.

*Primary Examiner* — Tisha D Lewis
(74) *Attorney, Agent, or Firm* — Alleman Hall & Tuttle LLP

(57) ABSTRACT

A method of controlling a hybrid vehicle including an engine, a motor, a starter, a friction engagement element provided between the engine and the motor, and a mechanical oil pump which is driven by the motor and supplies oil to the friction engagement element, is provided. When the friction engagement element is in a disengaged state, a first traveling mode using the motor is performed. When it is in an engaged state, a second traveling mode at least using the engine is performed. The method includes, when the first traveling mode is unperformable, starting the engine by the starter to perform the second traveling mode, activating the motor and performing a hydraulic pressure control for shifting the friction engagement element from the disengaged to engaged state after starting the engine. The hydraulic pressure control uses at least the hydraulic pressure from the mechanical oil pump driven by activating the motor.

18 Claims, 5 Drawing Sheets

(51) Int. Cl.
*B60K 6/387* (2007.10)
*B60W 10/02* (2006.01)
*B60W 20/40* (2016.01)
*B60W 30/194* (2012.01)

(52) U.S. Cl.
CPC .......... *B60W 10/30* (2013.01); *B60W 30/194* (2013.01); *B60W 2510/0208* (2013.01); *B60W 2510/0657* (2013.01)

(58) Field of Classification Search
CPC ... B60W 2510/0657; B60W 2510/244; B60W 2710/021; B60W 2710/022; B60W 2710/027; B60W 2710/0666; B60W 2710/083; B60W 2710/305; B60W 10/023; B60W 10/06; B60W 10/08; B60W 10/26; B60W 30/18027; B60W 20/13; B60W 30/1886; B60K 6/26; B60K 6/387; B60K 2006/4825; B60K 6/38
See application file for complete search history.

(56) References Cited

U.S. PATENT DOCUMENTS

| | | |
|---|---|---|
| 2016/0214600 A1 | 7/2016 | Miyaishi |
| 2021/0171014 A1 | 6/2021 | Blue et al. |

\* cited by examiner

METHOD OF CONTROLLING HYBRID VEHICLE AND CONTROL SYSTEM

TECHNICAL FIELD

The present disclosure relates to a method of controlling a hybrid vehicle provided with an engine and a motor as power sources, and a friction engagement element (clutch) which switches between transmission and interception of torque between the engine and the motor, and also relates to a control system therefor.

BACKGROUND OF THE DISCLOSURE

Conventionally, it is known that hybrid vehicles are provided with an engine (internal combustion engine), a motor (electric motor) provided downstream of the engine in a power transmission path to wheels, and a clutch (friction engagement element) provided between the engine and the motor so as to be connectable and disconnectable. This hybrid vehicle performs a first traveling mode in which the hybrid vehicle travels using torque of the motor without using torque of the engine (electric vehicle (EV) traveling mode) when the clutch is in a released (disengaged) state, and a second traveling mode in which the hybrid vehicle travels at least using the engine torque (engine traveling mode or hybrid traveling mode) when the clutch is in an engaged state.

For example, JP5980436B2 discloses a technique relevant to such a hybrid vehicle. In detail, this technique starts a motor after an engine is cold started, and continues a cold hydraulic pressure control for limiting a transmission to a low line pressure in order to suppress a discharge amount from an oil pump, until a clutch between the engine and the motor is engaged.

Although the hybrid vehicle described above fundamentally performs a first traveling mode using the torque of the motor during a startup of the vehicle without activating the engine in order to improve fuel efficiency, it performs a second traveling mode using the torque of the engine, when a battery which supplies electric power to the motor is low. Normally, when starting the engine in order to perform the second traveling mode, although the engine is started by the torque of the motor (i.e., by cranking with the motor), the motor may be unable to generate the torque required for starting the engine in the case where the battery is low as described above. Here, if the hybrid vehicle is provided with a starter in addition to the motor, the engine can be started appropriately by the starter, without activating the motor.

In this way, when the engine is started by the starter, by engaging the clutch provided between the engine and the motor (i.e., the clutch provided downstream of the engine in a power transmission path to wheels of the vehicle), engine power is transmitted to the wheels via the clutch and the motor. When starting the engine and transmitting the power to the wheels via the motor, in a situation where the motor is not activated because of the reason described above, the motor is also rotated by the rotation of the engine (eventually, when a motor rotational speed coincides with an engine speed, the engine power is transmitted to the wheels via the motor). At this time, the engine startability may be deteriorated by the engine torque being used for raising the motor rotational speed. In other words, the engine startability may be deteriorated by a torque difference between the engine and the motor. In the worst case, the engine may stall.

On the other hand, some hybrid vehicles may operate the clutch provided between the engine and the motor by using a hydraulic pressure from a mechanical oil pump which is driven by the motor. In such a hybrid vehicle, since the motor is not activated when the engine is started by the starter as described above, the controllability for engaging the clutch may be deteriorated because the mechanical oil pump does not operate appropriately.

SUMMARY OF THE DISCLOSURE

The present disclosure is made in view of solving the above-described problems of the conventional technique, and one purpose thereof is to provide a method of controlling a hybrid vehicle having a friction engagement element which is provided between an engine and a motor, and operates using hydraulic pressure from a mechanical oil pump driven by the motor, and to provide a control system therefor. When performing a traveling mode using the engine during a startup, the method suppresses deterioration of the engine startability, while securing the controllability of the friction engagement element.

In order to achieve the above-described purpose, the present disclosure provides a method of controlling a hybrid vehicle including an engine, a motor, a starter which starts the engine, a friction engagement element provided between the engine and the motor so as to be engageable and disengageable, and a mechanical oil pump which is driven by the motor and supplies oil to the friction engagement element. When the friction engagement element is in a disengaged state, a first traveling mode in which the hybrid vehicle travels using torque of the motor without using torque of the engine is performed, and when the friction engagement element is in an engaged state, a second traveling mode in which the hybrid vehicle travels at least using the torque of the engine is performed. The method includes determining whether the first traveling mode is performable during a startup of the hybrid vehicle, starting the engine by the starter to perform the second traveling mode, when the first traveling mode is determined to be unperformable, activating the motor after the starting the engine, and performing a hydraulic pressure control for applying a hydraulic pressure to the friction engagement element so that the friction engagement element shifts from the disengaged state to the engaged state after the starting the engine. The performing the hydraulic pressure control uses at least the hydraulic pressure from the mechanical oil pump driven by the activating the motor.

According to this configuration, during the startup of the hybrid vehicle, when it is determined that the first traveling mode using the torque of the motor is unperformable, the motor is activated after starting the engine by the starter in order to perform the second traveling mode, and the hydraulic pressure control for applying hydraulic pressure to the friction engagement element is performed so that it shifts from the disengaged state to the engaged state. Particularly, according to the present disclosure, the hydraulic pressure control is performed by at least using the hydraulic pressure from the mechanical oil pump driven by the activation of the motor.

By thus activating the motor before performing the hydraulic pressure control of the friction engagement element, the mechanical oil pump can be operated appropriately, and the controllability of the friction engagement element can be secured. Further, when controlling the friction engagement element in this way to shift it from the disengaged state to the engaged state (i.e., when transmitting the torque of the engine to the motor via the friction engagement element), since the motor is operated, the startability deterioration of the engine which is caused by the torque of the engine being used for raising the motor rotational speed (in other words, caused by a torque difference between the engine and the motor) can be suppressed, as compared with the case where the motor is not operated. Therefore, according to the present disclosure, when performing the second traveling mode using the engine during the startup of the vehicle, it can suppress the startability deterioration of the engine, and it can secure the controllability of the friction engagement element.

Further, according to the present disclosure, by activating the motor after the startup of the engine, it can shorten the operating time of the motor so that the power consumption of the battery is reduced.

The performing the hydraulic pressure control may be started substantially at the same time as the activation start of the motor.

According to this configuration, the friction engagement element can be promptly shifted from the disengaged state to the engaged state, as compared with the case where the hydraulic pressure control is started after the activation of the motor.

The hybrid vehicle may further include an electric oil pump which supplies oil to the friction engagement element, separately from the mechanical oil pump. The electric oil pump may be activated before the mechanical oil pump is activated, and the hydraulic pressure control may be performed using the hydraulic pressure from the electric oil pump.

According to this configuration, the electric oil pump is activated before the mechanical oil pump is activated, and the hydraulic pressure control is performed using the hydraulic pressure from the electric oil pump. Therefore, the friction engagement element can be promptly shifted from the disengaged state to the engaged state, as compared with the case where only the mechanical oil pump is used.

The electric oil pump may be smaller than the mechanical oil pump.

According to this configuration, by using the small electric oil pump, an improvement in mountability, a simplification of the configuration, and power saving can be realized.

Meanwhile, in the above-described configuration, in other words, the electric oil pump discharges a smaller amount of oil than the mechanical oil pump. Thus, it is difficult to perform a precise hydraulic pressure control using the oil supplied from the electric oil pump. However, since the precise control is not required at the beginning of the hydraulic pressure control using the electric oil pump, the electric oil pump can still fully satisfy the control demand. In a subsequent stage which requires the precise control, the mechanical oil pump which can perform the precise control can certainly satisfy the control demand.

The friction engagement element may have a hydraulic chamber into which oil is introduced, and become in one of the engaged state and the disengaged state according to the oil introduced into the hydraulic chamber. When the performing the hydraulic pressure control is started, the hydraulic chamber of the friction engagement element may be filled up with the oil at least using the hydraulic pressure from the electric oil pump.

According to this configuration, the hydraulic chamber of the friction engagement element is filled up (precharged) with oil by using at least the hydraulic pressure from the electric oil pump, during the start of the hydraulic pressure control. Therefore, the precharge can be performed appropriately by the electric oil pump during the start of hydraulic pressure control at which the mechanical oil pump is not fully activated.

The method may further include temporarily activating the electric oil pump before the starting the engine so that at least a hydraulic system which supplies oil to the friction engagement element is filled up with oil.

According to this configuration, by temporarily activating the electric oil pump before the startup of the engine (i.e., immediately after the start of the hybrid vehicle), the oil can be filled up in advance inside the hydraulic system which supplies the oil to the friction engagement element, etc. Therefore, the subsequent hydraulic pressure control of the friction engagement element can be started promptly.

The electric oil pump may suspend the supply of oil to the friction engagement element after the activation of the mechanical oil pump.

According to this configuration, the power consumption by the electric oil pump can be reduced.

In another aspect, in order to achieve the above-described purpose, the present disclosure provides a control system for a hybrid vehicle including an engine, a motor, a starter which starts the engine, a friction engagement element provided between the engine and the motor so as to be engageable and disengageable, a mechanical oil pump which is driven by the motor and supplies oil to the friction engagement element, and a control device which controls the engine, the starter, the motor, and the friction engagement element. When the friction engagement element is in a disengaged state, the control device performs a first traveling mode in which the hybrid vehicle travels using torque of the motor without using torque of the engine. When the friction engagement element is in an engaged state, the control device performs a second traveling mode in which the hybrid vehicle travels at least using the torque of the engine. The control device further determines whether the first traveling mode is performable during a startup of the hybrid vehicle, starts the engine by the starter to perform the second traveling mode, when the first traveling mode is determined to be unperformable, activates the motor after the startup of the engine, and performs a hydraulic pressure control for applying a hydraulic pressure to the friction engagement element so that the friction engagement element shifts from the disengaged state to the engaged state after the startup of the engine. The control device further performs the hydraulic pressure control at least using the hydraulic pressure from the mechanical oil pump driven by the activation of the motor.

Also according to this configuration, when performing the second traveling mode using the engine during the startup of the vehicle, the startability deterioration of the engine can be suppressed, and the controllability of the friction engagement element can be secured.

DETAILED DESCRIPTION OF THE DISCLOSURE

Hereinafter, a method of controlling a hybrid vehicle according to one embodiment of the present disclosure, and a control system therefor, will be described with reference to the accompanying drawings.

Device Configuration

Figure 1:
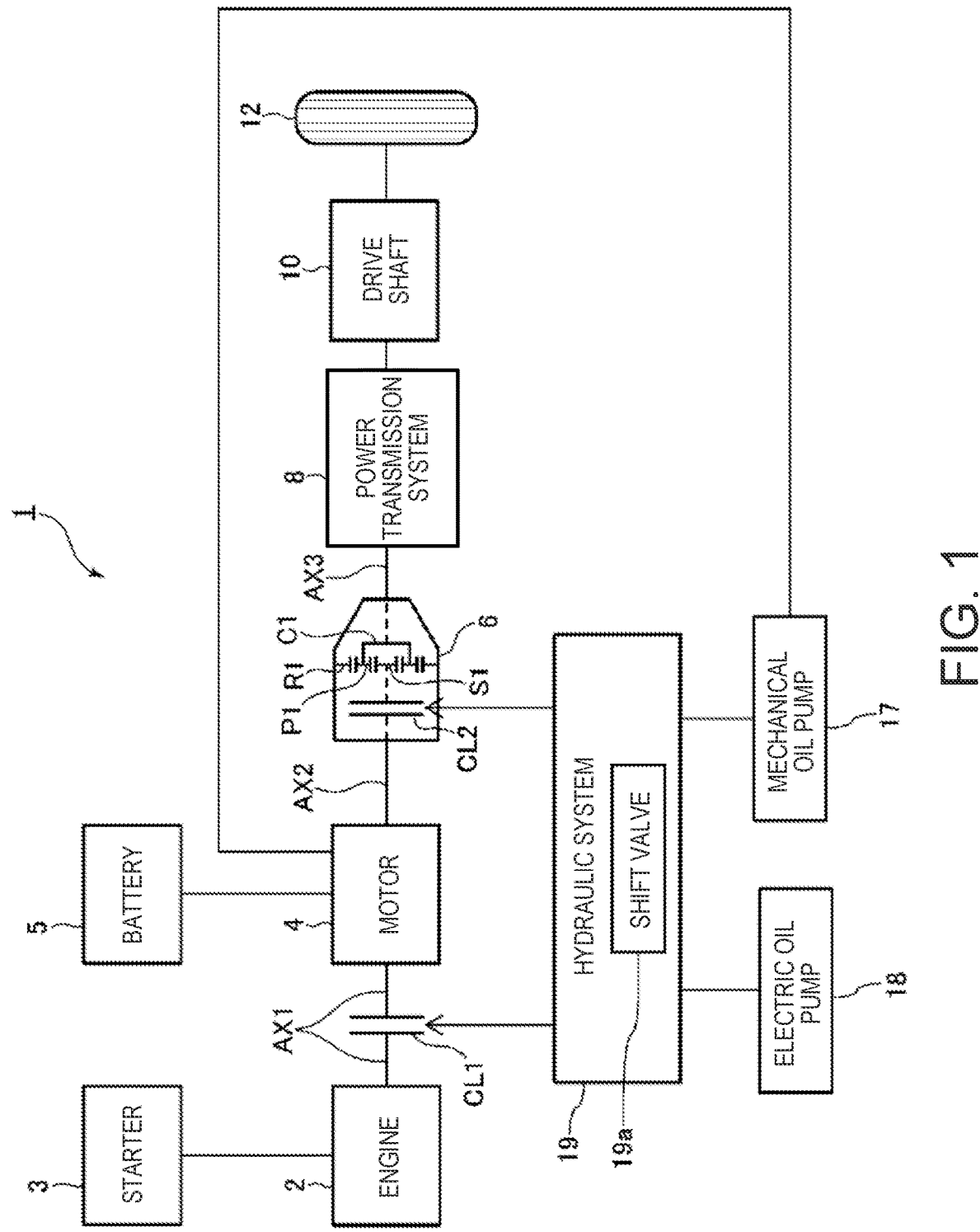
FIG. 1 is an outline block diagram of a hybrid vehicle according to one embodiment of the present disclosure.

FIG. 1 is an outline block diagram of the hybrid vehicle to which the method of controlling the hybrid vehicle according to this embodiment of the present disclosure is applied, and the control system therefor.

As illustrated in FIG. 1, a hybrid vehicle 1 mainly includes an engine 2 (for example, a gasoline engine) which generates a torque for driving or propelling the hybrid vehicle 1, a starter 3 which is a motor for starting the engine 2, a motor 4 which is provided downstream of the engine 2 in a power transmission path of the hybrid vehicle 1, and generates the torque for driving the hybrid vehicle 1, a battery 5 which delivers and receives electric power to and from the motor 4 via an inverter (not illustrated), a transmission 6 which is provided downstream of the motor 4 in the power transmission path of the hybrid vehicle 1, and changes an engine speed of the engine 2 and/or a rotational speed of the motor 4, a power transmission system 8 which transmits a torque from the transmission 6 to a downstream side thereof, a drive shaft 10 which drives wheels 12 by the torque from the power transmission system 8, and the wheels (driving wheels) 12.

An output shaft of the engine 2 and a rotational shaft of the motor 4 are coaxially coupled to each other by an axis AX1 via a first clutch CL1 which is connectable and disconnectable (engageable and disengageable). This first clutch CL1 switches between transmission and interception of the torque between the engine 2 and the motor 4. For example, the first clutch CL1 is comprised of a dry multi-plate clutch or a wet multiplate clutch which controls continuously or stepwisely a clutch operating fluid flow rate and/or a clutch operating fluid pressure by a motor or a solenoid (not illustrated) and is able to change a transmitting torque capacity.

Figure 2:
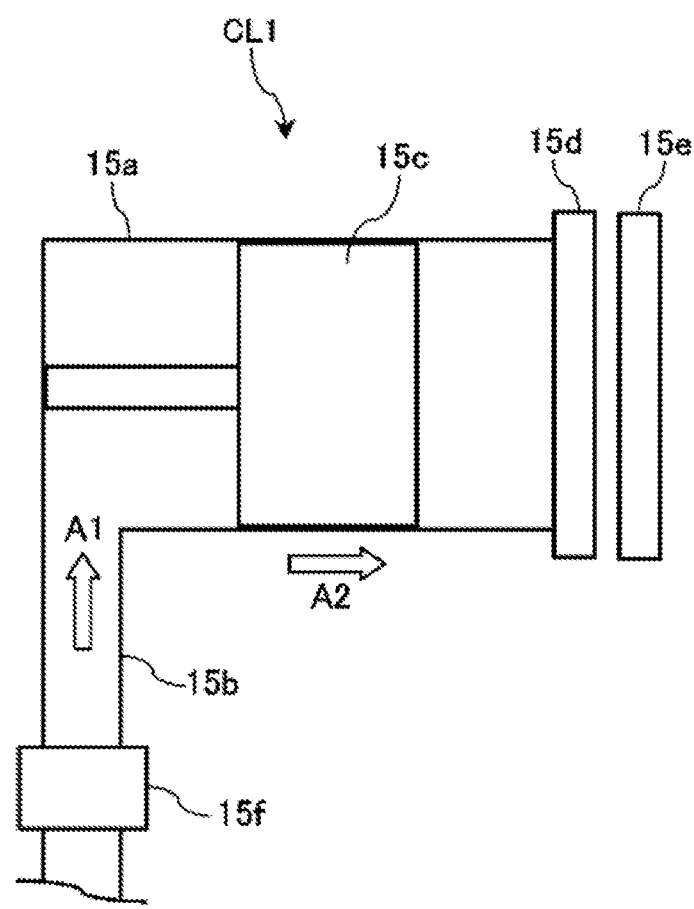
FIG. 2 is an outline block diagram of a first clutch according to this embodiment of the present disclosure.

Here, referring to FIG. 2, a concrete structure of the first clutch CL1 is described. FIG. 2 is an outline block diagram illustrating one example of the first clutch CL1. As illustrated in FIG. 2, the first clutch CL1 includes a hydraulic chamber 15a into which oil is introduced, an oil passage 15b (see an arrow A1) which supplies oil to the hydraulic chamber 15a, a clutch piston 15c (see an arrow A2) which operates according to the oil supplied to the hydraulic chamber 15a (i.e., hydraulic pressure), a first clutch plate 15d with which the clutch piston 15c contacts, a second clutch plate 15e which becomes transmittable of a torque with the first clutch plate 15d when the clutch piston 15c contacts the first clutch plate 15d, and a solenoid 15f which is provided to the oil passage 15b and is adjustable of the hydraulic pressure supplied to the hydraulic chamber 15a.

The first clutch CL1 is able to change, by controlling the hydraulic pressure applied, between a released or disengaged state where the clutch piston 15c separates from the first clutch plate 15d, and an engaged state where the clutch piston 15c contacts the first clutch plate 15d. In the disengaged state of the first clutch CL1, the torque transmission between the engine 2 and the motor 4 is intercepted, and in the engaged state of the first clutch CL1, the torque is transmitted between the engine 2 and the motor 4. Although this engaged state is the state where the clutch piston 15c is in contact with the first clutch plate 15d as described above, this state includes a slip state where the first clutch plate 15d and the second clutch plate 15e slip (typically, a state where the first clutch plate 15d and the second clutch plate 15e separate from each other, and the torque is transmitted via oil therebetween), and a fully engaged state where the torque is fully transmitted between the first clutch plate 15d and the second clutch plate 15e (fundamentally, a state where the first clutch plate 15d and the second clutch plate 15e contact each other firmly). Note that such a first clutch CL1 is one example of a "friction engagement element" in the present disclosure.

Returning to FIG. 1, the rotational shaft of the motor 4 and the rotational shaft of the transmission 6 are coaxially coupled to each other via an axis AX2. Typically, the transmission 6 includes therein one or more planetary gear sets having a sun gear S1, a ring wheel R1, a pinion gear P1 (planet gear), and a carrier C1, and a friction engagement element, such as a clutch and a brake, and is an automatic transmission having a function for automatically switching a gear stage (gear ratio) according to a vehicle traveling speed, an engine speed, etc. The ring wheel R1 is disposed coaxially with the sun gear S1, and the pinion gear P1 is disposed between the sun gear S1 and the ring wheel R1 so that it meshes with the sun gear S1 and the ring wheel R1. The carrier C1 holds the pinion gear P1 so as to be rotatable, and so as to be able to revolve around the sun gear S1.

Further, the transmission 6 includes therein a second clutch CL2 which is connectable and disconnectable (engageable and disengageable), and the second clutch CL2 switches between transmission and interception of a torque between the upstream side of the transmission 6 (the engine 2 and the motor 4) and the downstream side of the transmission 6 (the wheel 12, etc.). For example, the second clutch CL2 is comprised of a dry multiplate clutch or a wet multiplate clutch which controls continuously or stepwisely the clutch operating fluid flow rate and/or the clutch operating fluid pressure by the motor and the solenoid (not illustrated) and is changeable of the transmitting torque capacity. Further, the second clutch CL2 is also able to switch a state between a released or disengaged state and an engaged state (a slip state or a fully engaged state) by controlling the hydraulic pressure applied.

Note that, in fact, the second clutch CL2 is comprised of a large number of clutches which are used to variously switch the gear stage of the transmission 6. Further, although in FIG. 1 only one planetary gear set is illustrated for simplification, the transmission 6 is actually provided with a plurality of planetary gear sets. For example, by selectively engaging the friction engagement elements, such as a plurality of clutches which are represented by the second clutch CL2, and a plurality of brakes (not illustrated), and switching the power transmission path passing through the planetary gear sets, a plurality of forward gear stages and one reverse gear stage can be realized.

A torque is inputted into the power transmission system 8 via an output axis AX3 of the transmission 6. The power transmission system 8 is comprised of a differential gear which distributes a driving force to a pair of left and right wheels 12, and a final gear.

Further, the hybrid vehicle 1 includes a mechanical oil pump 17 which supplies oil to the first clutch CL1 and the second clutch CL2 by being driven by the motor 4 (in detail, it is coupled to an axis AX2 immediately downstream of the motor 4 to be driven by the motor 4), an electric oil pump 18 which supplies oil to the first clutch CL1 and the second clutch CL2 by being driven by electric power from the battery 5, a hydraulic system 19 which is provided with a hydraulic circuit, a solenoid valve, etc., and supplies oil from the mechanical oil pump 17 and the electric oil pump 18 to the first clutch CL1 and the second clutch CL2. The electric oil pump 18 is configured smaller than the mechanical oil pump 17. In other words, the electric oil pump 18 is smaller in the discharge amount of oil than the mechanical oil pump 17.

The hydraulic system 19 has a shift valve 19a which is able to switch its state so that oil is supplied from either one of the mechanical oil pump 17 and the electric oil pump 18. When oil at a sufficient hydraulic pressure is supplied from the mechanical oil pump 17, this shift valve 19a intercepts an oil passage for supplying oil from the electric oil pump 18. In more detail, in a case where both the mechanical oil pump 17 and the electric oil pump 18 operate, when the mechanical oil pump 17 does not generate the sufficient hydraulic pressure (for example, when the operation of the motor 4 which drives the mechanical oil pump 17 is started), the shift valve 19a makes oil from both the mechanical oil pump 17 and the electric oil pump 18 flow downstream, and when the mechanical oil pump 17 generates the sufficient hydraulic pressure, it intercepts the oil passage from the electric oil pump 18 and makes only the oil from the mechanical oil pump 17 flow downstream. Note that, actually, the hydraulic system 19 supplies oil also from other than the mechanical oil pump 17 and the electric oil pump 18, and supplies oil to other than the first clutch CL1 and the second clutch CL2.

Here, a traveling mode of the hybrid vehicle 1 is changeable by switching engagement and release of the first clutch CL1. That is, the hybrid vehicle 1 has a first traveling mode in which the first clutch CL1 is set to the disengaged state and the travel hybrid vehicle 1 travels using the torque of the motor 4, without using the torque of the engine 2, and a second traveling mode in which the first clutch CL1 is set to the engaged state, and the hybrid vehicle 1 travels at least using the torque of the engine 2. The first traveling mode is a so-called electric vehicle (EV) traveling mode, and the second traveling mode includes an engine traveling mode in which the hybrid vehicle 1 travels only using the torque of the engine 2, and a hybrid traveling mode in which the hybrid vehicle 1 travels using the torques of both the engine 2 and the motor 4.

Figure 3:
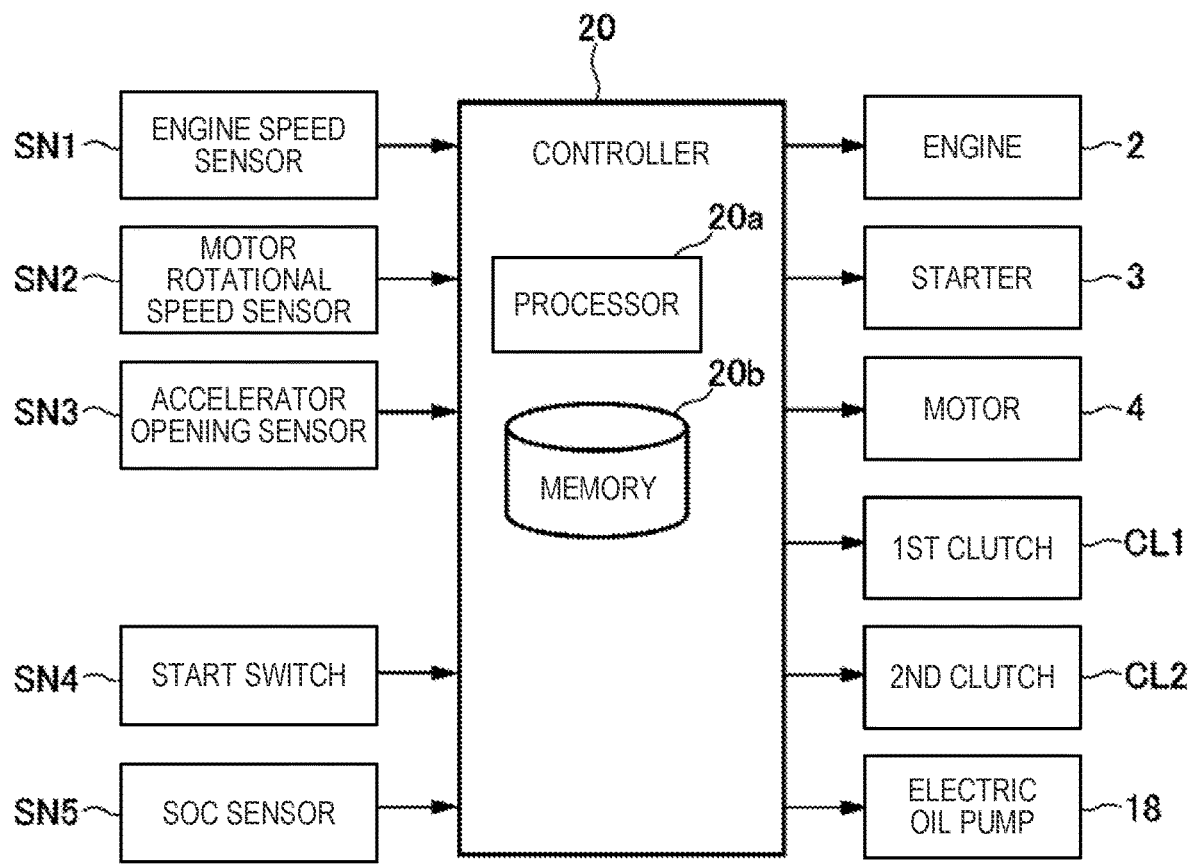
FIG. 3 is a block diagram illustrating an electric configuration of the hybrid vehicle according to this embodiment of the present disclosure.

Next, FIG. 3 is a block diagram illustrating an electric configuration of the hybrid vehicle according to this embodiment of the present disclosure.

As illustrated in FIG. 3, a signal from an engine speed sensor SN1 which detects an engine speed of the engine 2, a signal from a motor rotational speed sensor SN2 which detects a rotational speed of the motor 4, a signal from an accelerator opening sensor SN3 which detects an accelerator opening corresponding to a depressing amount of an accelerator pedal by a vehicle driver, a signal from a start switch SN4 for starting the hybrid vehicle 1, and a signal from an SOC sensor SN5 which detects an SOC (State of Charge) indicative of a charged amount of the battery 5, are inputted into a controller 20.

The controller 20 is comprised of a computer provided with one or more processors 20a (typically, central processing units (CPUs)), and memory 20b, such as ROM and RAM, which stores various kinds of programs interpreted and executed by the processors (including a basic control program, such as an operating system (OS), and an application program which is booted on the OS and realizes a specific function), and various kinds of data. The controller 20 is one example of a "control device" in the present disclosure, and performs a "method of controlling a hybrid vehicle" in the present disclosure.

In detail, the controller 20 outputs a control signal mainly to the engine 2, the starter 3, the motor 4, the first clutch CL1, the second clutch CL2, and the electric oil pump 18 to control them based on the signals from the sensors (including the switch) SN1-SN5 described above. For example, the controller 20 performs a control for adjusting an ignition timing, a fuel injection timing, a fuel injection amount of the engine 2, a control for adjusting a rotational speed and a torque of the motor 4, a hydraulic pressure control for switching states of the first and second clutches CL1 and CL2 (a disengaged state, a slip state, and a fully engaged state), a control for switching ON/OFF of the electric oil pump 18, etc. Actually, the controller 20 controls a spark plug, a fuel injection valve, and a throttle of the engine 2, controls the motor 4 via an inverter, and controls the first and second clutches CL1 and CL2 via a hydraulic control circuit (the motor, the solenoid 15f, etc.).

Content of Control

Next, the controls performed by the controller 20 in this embodiment are described. In this embodiment, during a startup of the hybrid vehicle 1 by the driver operating the start switch SN4, when the first traveling mode using the torque of the motor 4 is unperformable (typically, when the SOC of the battery 5 is below a given value), the controller 20 activates the motor 4, after starting the engine 2 by the starter 3, in order to perform the second traveling mode, and performs a hydraulic pressure control for applying a hydraulic pressure to the first clutch CL1 so that it shifts from the disengaged state to the engaged state. Below, such a control performed during the startup of the hybrid vehicle 1 is referred to as "vehicle startup control." Particularly, in this embodiment, the controller 20 performs the hydraulic pressure control for shifting the first clutch CL1 from the disengaged state to the engaged state, by at least using the hydraulic pressure from the mechanical oil pump 17 driven by the activation of the motor 4, when performing the vehicle startup control.

According to this embodiment, by activating the motor 4 before performing the hydraulic pressure control of the first clutch CL1, the mechanical oil pump 17 can be operated appropriately, and the controllability of the first clutch CL1 can be secured. Further, when controlling the first clutch CL1 in this way to shift it from the disengaged state to the engaged state (i.e., when transmitting the torque of the engine 2 to the motor 4 via the first clutch CL1), since the motor 4 is operated, the startability deterioration of the engine 2 which is caused by the torque of the engine 2 being used for raising the motor rotational speed can be suppressed, as compared with the case where the motor 4 is not operated.

Further, in this embodiment, the controller 20 activates the electric oil pump 18 before the mechanical oil pump 17 is activated, and performs the above-described hydraulic pressure control using the hydraulic pressure from the electric oil pump 18. Therefore, the first clutch CL1 can be promptly shifted from the disengaged state to the engaged state, as compared with the case where only the mechanical oil pump 17 is used. Since the supply of oil from the electric oil pump 18 activated in this way to the first clutch CL1 is suspended by the above-described shift valve 19a of the hydraulic system 19 after the mechanical oil pump 17 is fully activated, the power consumption thereafter by the electric oil pump 18 can be reduced.

Further, in this embodiment, the controller 20 mainly uses the oil supplied to the first clutch CL1 from the electric oil pump 18 activated as described above for the oil filling (precharge) to the hydraulic chamber 15a of the first clutch CL1 which is made when the hydraulic pressure control is started. Since the electric oil pump 18 is less in the oil discharging amount than the mechanical oil pump 17, it is difficult to perform a precise hydraulic pressure control using the oil supplied from the electric oil pump 18. However, since the precise control is not required during the start of the hydraulic pressure control at which the precharge is carried out, the electric oil pump 18 can also fully satisfy the control demand. Further, in a stage after the precharge where the precise control is required in the hydraulic pressure control (for example, a stage where the clutch piston 15c is moved inside the first clutch CL1 to bring it into contact with the first clutch plate 15d), since the mechanical oil pump 17 which can perform the precise control is fully activated, the mechanical oil pump 17 can certainly satisfy the control demand.

Figure 4:
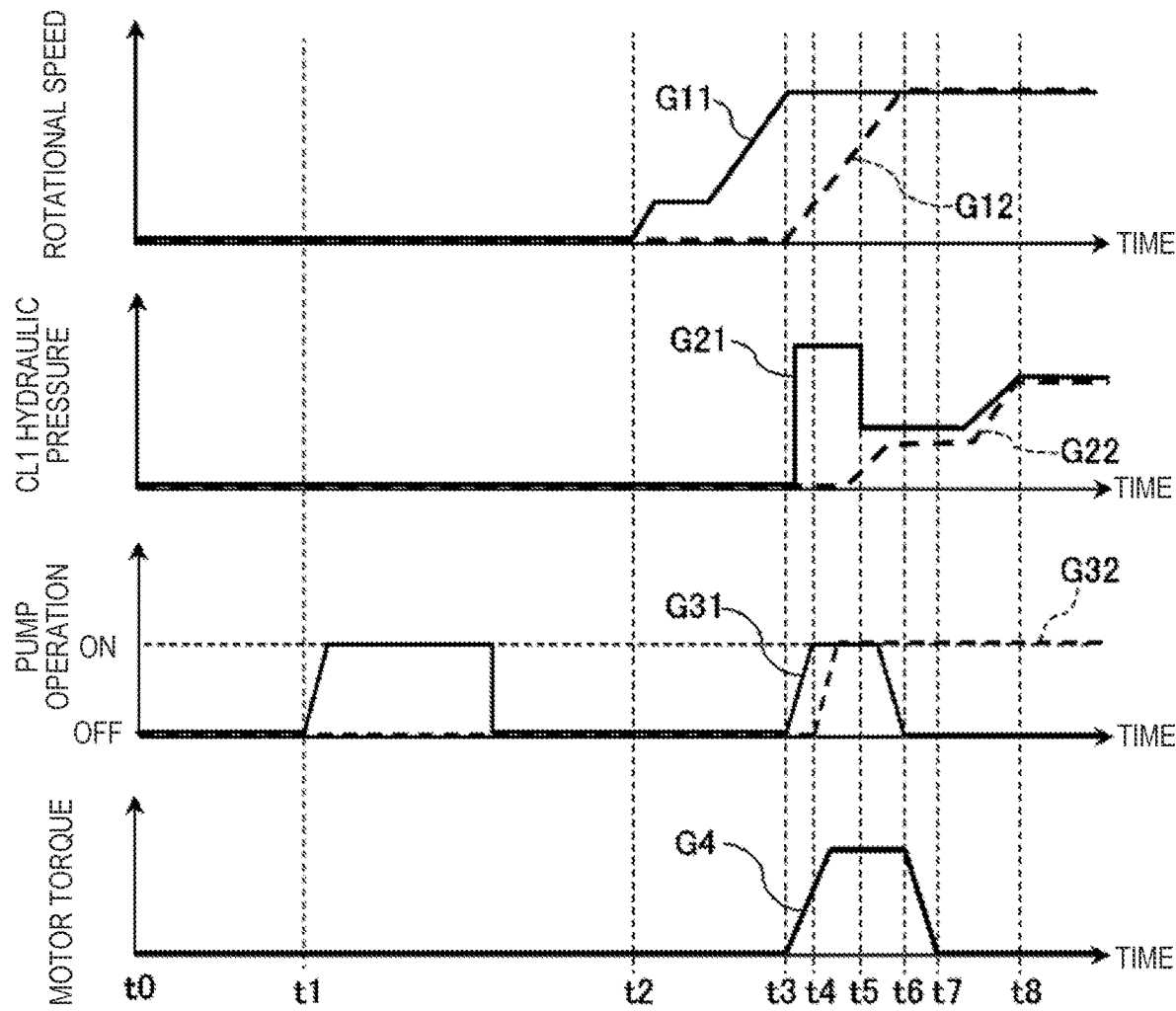
FIG. 4 is a time chart illustrating a vehicle startup control according to this embodiment of the present disclosure.

Next, referring to FIG. 4, the vehicle startup control according to this embodiment is described concretely. FIG. 4 is a time chart illustrating the vehicle startup control according to this embodiment.

In FIG. 4, a graph G11 illustrates an engine speed, a graph G12 illustrates a motor rotational speed, a graph G21 illustrates a command value (indicated hydraulic pressure) of the hydraulic pressure given to the first clutch CL1 in the hydraulic pressure control (hereinafter, referred to as "CL1 hydraulic pressure"), a graph G22 illustrates an actual hydraulic pressure of the CL1 hydraulic pressure when applying the indicated hydraulic pressure, a graph G31 illustrates an operating state (ON/OFF) of the electric oil pump 18, a graph G32 illustrates an operating state (ON/OFF) of the mechanical oil pump 17, and a graph G4 illustrates an output torque of the motor 4 (motor torque).

Note that ON/OFF of the electric oil pump 18 means existence/non-existence of the supply of oil from the electric oil pump 18 to the first clutch CL1, and does not necessarily correspond to activation/inactivation of the electric oil pump 18. Even if the electric oil pump 18 does not supply oil to the first clutch CL1, the electric oil pump 18 may operate, and, in this case, the electric oil pump 18 may supply oil to components other than the first clutch CL1 (for example, it may supply oil for lubricating those components).

First, at time t0, the driver operates the start switch SN4 to start the hybrid vehicle 1. At time t1 immediately thereafter, the controller 20 temporarily activates the electric oil pump 18 so that the hydraulic system 19 which supplies oil to various components, such as the first clutch CL1 and the second clutch CL2, is filled up with oil (graph G31). Then, at time t2, since the SOC of the battery 5 is below the given value, the controller 20 determines that the first traveling mode is unperformable, and starts the engine 2 by the starter 3 to perform the second traveling mode (graph G11).

Then, when the engine 2 is started (in detail, the engine speed reaches a given idling speed), the controller 20 starts the activation of the motor 4 at time t3. Therefore, the motor rotational speed and the motor torque rise gradually (graphs G12 and G4). Note that in the state where the SOC of the battery 5 is below the given value as described above, the motor 4 cannot be activated to perform the first traveling mode, but the motor 4 can be activated to raise the motor rotational speed.

Further, substantially at the same time as such an activation of the motor 4, the controller 20 starts activating the electric oil pump 18 (graph G31), and in order to start the hydraulic pressure control for shifting the first clutch CL1 from the disengaged state to the engaged state, it sets the solenoid 15f as "open" so that oil is supplied to the first clutch CL1 (not illustrated in FIG. 4). Although the motor 4 starts operating promptly after an activation command is issued, since the solenoid 15f of the first clutch CL1 takes more time than the motor 4 until it starts operating after the command is issued, the hydraulic pressure control of the first clutch CL1 starts (in detail, the indicated hydraulic pressure of the CL1 hydraulic pressure for the hydraulic pressure control rises) slightly after the time t3 at which the motor 4 starts the operation (graph G21).

When the hydraulic pressure control is started, the controller 20 first sets the indicated hydraulic pressure to a comparatively large hydraulic pressure for filling up (precharge) the hydraulic chamber 15a of the first clutch CL1 with oil (graph G21). The indicated hydraulic pressure during the precharge can be realized initially by the oil supplied from the electric oil pump 18. Then, at time t4, the mechanical oil pump 17 begins to operate by being driven by the motor 4 (graph G32). Thereafter, the indicated hydraulic pressure during the precharge can be realized by the oil supplied from both the mechanical oil pump 17 and the electric oil pump 18.

Then, at time t5, the controller 20 ends the above-described precharge, and greatly reduces the indicated hydraulic pressure from the hydraulic pressure during the precharge and maintains it substantially constant (graph G21), to move the clutch piston 15c which is separated from the first clutch plate 15d in the first clutch CL1 so that the clutch piston 15c is brought into contact with the first clutch plate 15d. That is, the first clutch CL1 is engaged. In more detail, the first clutch CL1 is changed from the disengaged state into the slip state, and maintains the slip state thereafter.

In the middle of performing the hydraulic pressure control from the time t5, the mechanical oil pump 17 is fully activated at time t6, and the shift valve 19a of the hydraulic system 19 is thus operated to suspend the supply of oil from the electric oil pump 18 to the first clutch CL1 (graph G31). Then, at time t7, since the motor rotational speed coincides with the engine speed, the controller 20 suspends the operation of the motor 4 (graph G4). Further, the controller 20 raises the indicated hydraulic pressure in order to set the first clutch CL1 to the fully engaged state, and then maintains the indicated hydraulic pressure constant from time t8 to maintain the first clutch CL1 at the fully engaged state (graph G21). Then, the controller 20 ends the hydraulic pressure control, and ends the vehicle startup control.

Figure 5:
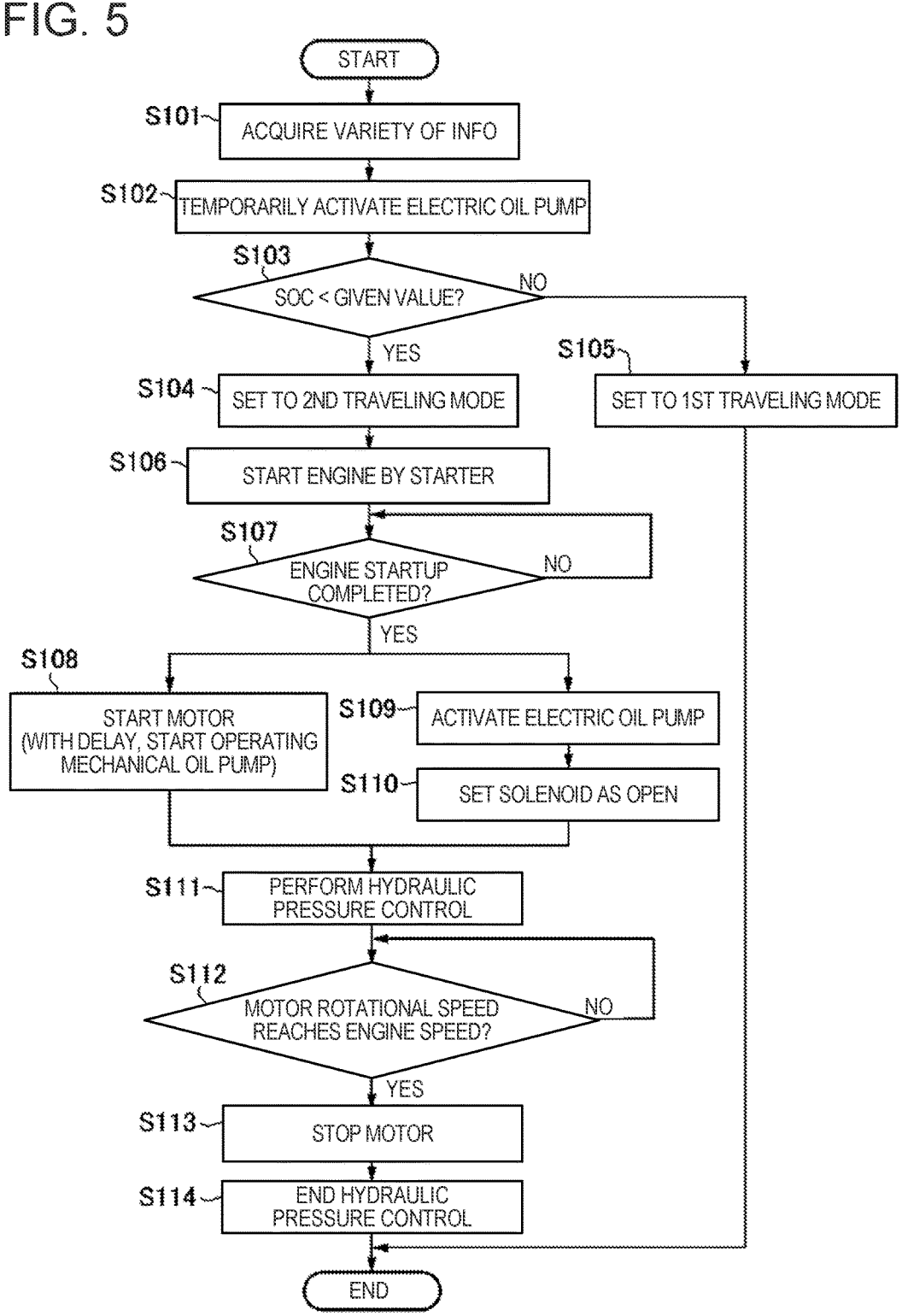
FIG. 5 is a flowchart illustrating the vehicle startup control according to this embodiment of the present disclosure.

Next, referring to FIG. 5, the overall flow of the vehicle startup control according to this embodiment is described. FIG. 5 is a flowchart illustrating the vehicle startup control performed by the controller 20 in this embodiment.

This vehicle startup control is started when the driver operates the start switch SN4 of the hybrid vehicle 1. First, at Step S101, the controller 20 acquires a variety of information. In detail, the controller 20 acquires the signals at least from the sensors (including the switch) SN1-SN5 described above. Then, at Step S102, the controller 20 temporarily activates the electric oil pump 18 for a given period of time set beforehand to fill up the hydraulic system 19, which supplies oil to the various components, such as the first clutch CL1 and the second clutch CL2, with oil.

Next, at Step S103, the controller 20 determines whether the SOC of the battery 5 detected by the SOC sensor SN5 is below the given value. Here, it determines whether the SOC of the battery 5 is so low that the first traveling mode (EV traveling mode) using the torque of the motor 4 cannot be performed. From such a viewpoint, the SOC of the battery 5 below which the first traveling mode becomes impossible to be performed is set as the given value used for the determination of Step S103.

As a result of the determination of Step S103, if the SOC is below the given value (Step S103: Yes), the controller 20 proceeds to Step S104, where it sets the traveling mode which is applied to the hybrid vehicle 1 to the second traveling mode. On the other hand, if the SOC is above the given value (Step S103: No), the controller 20 proceeds to Step S105, where it sets the traveling mode which is applied to the hybrid vehicle 1 to the first traveling mode. Then, the controller 20 ends the vehicle startup control according to this embodiment which is the control related to the startup of the hybrid vehicle 1 in the second traveling mode, in order to start the hybrid vehicle 1 in the normal first traveling mode.

After Step S104, the controller 20 proceeds to Step S106, where it controls the starter 3 to start the engine 2. Then, at Step S107, the controller 20 determines whether the engine 2 is started. In detail, the controller 20 determines the startup of the engine 2 by determining whether the engine speed detected by the engine speed sensor SN1 reaches a given idling speed. As a result, if the engine 2 is started (Step S107: Yes), the controller 20 proceeds to Steps S108 and S109, and if the engine 2 is not started (Step S107: No), it returns to Step S107. In the latter case, the controller 20 repeats the determination of Step S107 until the engine 2 is started.

When the engine 2 is started, the controller 20 starts the activation of the motor 4 (Step S108), and substantially at the same time, it starts the operation of the electric oil pump 18 (Step S109), and sets the solenoid 15f of the first clutch CL1 as "open" in order to start the hydraulic pressure control for shifting the first clutch CL1 from the disengaged state to the engaged state (Step S110).

Next, the controller 20 proceeds to Step S111, where it performs the hydraulic pressure control. In detail, the controller 20 first sets the indicated hydraulic pressure to a comparatively large hydraulic pressure to fill up (precharge) the hydraulic chamber 15a of the first clutch CL1 with oil. This indicated hydraulic pressure during the precharge is initially realized only by the oil supplied from the electric oil pump 18 because the mechanical oil pump 17 is not activated, but when the mechanical oil pump 17 is activated by being driven by the motor 4 thereafter, it is realized by the oil supplied from both the mechanical oil pump 17 and the electric oil pump 18. Then, after the above-described precharge is completed, the controller 20 greatly reduces the indicated hydraulic pressure from the hydraulic pressure during the precharge and maintains it substantially constant, to move the clutch piston 15c which is separated from the first clutch plate 15d in the first clutch CL1 so that the clutch piston 15c is brought into contact with the first clutch plate 15d. In this case, the controller 20 changes the first clutch CL1 from the disengaged state to the slip state, and maintains the slip state thereafter. In the middle of performing such a hydraulic pressure control, by the mechanical oil pump 17 being fully activated, the shift valve 19a of the hydraulic system 19 is operated to suspend the supply of oil from the electric oil pump 18 to the first clutch CL1.

Next, at Step S112, the controller 20 determines whether the motor rotational speed which is raised by the above-described activation of the motor 4 reaches the engine speed. In this case, the controller 20 performs the determination of Step S112 based on the motor rotational speed detected by the motor rotational speed sensor SN2 and the engine speed detected by the engine speed sensor SN1. As a result, if the motor rotational speed reaches the engine speed (Step S112: Yes), the controller 20 proceeds to Step S113, and if the motor rotational speed does not reach the engine speed (Step S112: No), it returns to S112. In the latter case, the controller 20 repeats the determination of Step S112 until the motor rotational speed reaches the engine speed.

Next, at Step S113, since the motor rotational speed reaches the engine speed, the controller 20 suspends the operation of the motor 4. Then, at Step S114, the controller 20 raises the indicated hydraulic pressure in order to set the first clutch CL1 to the fully engaged state, then maintains the indicated hydraulic pressure constant in order to maintain the first clutch CL1 at the fully engaged state, and ends the hydraulic pressure control. Then, the controller 20 ends the vehicle startup control.

Operation and Effects

Next, operation and effects of the method of controlling the hybrid vehicle and the control system according to this embodiment of the present disclosure are described.

In this embodiment, when the first traveling mode using the torque of the motor 4 is unperformable during the startup of the hybrid vehicle 1, the controller 20 activates the motor 4 after the engine 2 is started by the starter 3 in order to perform the second traveling mode, and performs the hydraulic pressure control for applying hydraulic pressure to the first clutch CL1 so that the first clutch CL1 shifts from the disengaged state to the engaged state. Particularly, the controller 20 performs this hydraulic pressure control, at least using the hydraulic pressure from the mechanical oil pump 17 driven by the operation of the motor 4.

Thus, by activating the motor 4 before performing the hydraulic pressure control of the first clutch CL1, the mechanical oil pump 17 can be operated appropriately so that the controllability of the first clutch CL1 is secured. Further, when controlling the first clutch CL1 in this way to shift the state from the disengaged state to the engaged state (i.e., when transmitting the torque of the engine 2 to the motor 4 side via the first clutch CL1), since the motor 4 is activated, it can suppress the startability deterioration of the engine 2 which is caused by the torque of the engine 2 being used for raising the motor rotational speed (in other words, caused by a torque difference between the engine 2 and the motor 4), as compared with the case where the motor 4 is not operated. Thus, according to this embodiment, when performing the second traveling mode using the engine 2 during the startup, it can suppress the startability deterioration of the engine 2, and it can secure the controllability of the first clutch CL1.

Further, according to this embodiment, by activating the motor 4 after the startup of the engine 2, it can shorten the operating time of the motor 4 so that the power consumption of the battery 5 is reduced.

Moreover, in this embodiment, since the controller 20 starts the hydraulic pressure control substantially at the same time as the activation of the motor 4, it can shift the first clutch CL1 from the disengaged state to the engaged state promptly, as compared with the case where the hydraulic pressure control is started after the activation of the motor 4.

Further, in this embodiment, since the controller 20 activates the electric oil pump 18 before the mechanical oil pump 17 is activated to perform the hydraulic pressure control using the hydraulic pressure from the electric oil pump 18, it can shift the first clutch CL1 from the disengaged state to the engaged state promptly, as compared with the case where only the mechanical oil pump 17 is used.

Further, in this embodiment, the electric oil pump 18 is configured to be smaller than the mechanical oil pump 17. In this case, since the electric oil pump 18 is less in the discharge amount of oil than the mechanical oil pump 17, it is difficult to perform the precise hydraulic pressure control using the oil supplied from the electric oil pump 18, but since the precise control is not required at the beginning of the hydraulic pressure control using the electric oil pump 18, the electric oil pump 18 can still fully satisfy the control demand. In the subsequent stage which requires the precise control, the mechanical oil pump 17 which can perform the precise control can certainly satisfy the control demand. Further, by configuring the electric oil pump 18 to be small, an improvement in mountability, a simplification of the configuration, and power saving can be realized.

Further, in this embodiment, the controller 20 fills up (precharges) the hydraulic chamber 15a of the first clutch CL1 with oil by using at least the hydraulic pressure from the electric oil pump 18, during the start of the hydraulic pressure control. Therefore, the precharge can be performed appropriately by the electric oil pump 18 during the start of hydraulic pressure control at which the mechanical oil pump 17 is not fully activated.

Further, in this embodiment, since the controller 20 temporarily activates the electric oil pump 18 immediately after the startup of the hybrid vehicle 1, the oil can be filled up in advance inside the hydraulic system 19 which supplies the oil to the first clutch CL1, etc.

Further, in this embodiment, since the electric oil pump 18 suspends the supply of oil to the first clutch CL1 after the activation of the mechanical oil pump 17, the power consumption by the electric oil pump 18 can be reduced.

Modifications

In the above embodiment, when the SOC of the battery 5 is below the given value, it is determined that the first traveling mode by the motor 4 is unperformable, but, in another example, also when the temperature of the battery 5 is outside a given temperature range, and when there is an abnormality in a component related to the execution of the first traveling mode, it may be determined that the first traveling mode by the motor 4 is unperformable.

Further, in the above embodiment, after the engine 2 is fully started, the operation of the motor 4 is started, but, in another example, while the engine 2 is being started (in detail, before the engine speed reaches the given idling speed), the operation of the motor 4 may be started. That is, the operation of the motor 4 may be started after the startup of the engine 2 is started. Similarly, while the engine 2 is started, the operation of the electric oil pump 18 may be started, and the solenoid 15f of the first clutch CL1 may be set as "open."

Further, although in the above embodiment the supply of oil from the electric oil pump 18 to the first clutch CL1 is stopped after the precharge (see FIG. 4), in another example, the supply of oil from the electric oil pump 18 to the first clutch CL1 may be stopped by the mechanical oil pump 17 being fully activated and the shift valve 19a being operated during the precharge. Further, although in the above embodiment the mechanical oil pump 17 starts to operate during the precharge (see FIG. 4), in another example, the mechanical oil pump 17 may start to operate after the precharge.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Hybrid Vehicle
2 Engine
3 Starter
4 Motor
5 Battery
6 Transmission
8 Power Transmission System
12 Wheel
15a Hydraulic Chamber
17 Mechanical Oil Pump
18 Electric Oil Pump
19 Hydraulic System
20 Controller (Control Device)
CL1 First Clutch (Friction Engagement Element)
CL2 Second Clutch

What is claimed is:

1. A method of controlling a hybrid vehicle including an engine, a motor, a starter configured to start the engine, a friction engagement element provided between the engine and the motor so as to be engageable and disengageable, a mechanical oil pump configured to be driven by the motor and supply oil to the friction engagement element, and an electric oil pump configured to supply oil to the friction engagement element, separately from the mechanical oil pump, wherein when the friction engagement element is in a disengaged state, a first traveling mode in which the hybrid vehicle travels using torque of the motor without using torque of the engine is performed, and when the friction engagement element is in an engaged state, a second traveling mode in which the hybrid vehicle travels at least using the torque of the engine is performed, the method comprising steps of:

determining whether the first traveling mode is performable during a startup of the hybrid vehicle;

starting the engine by the starter to perform the second traveling mode, when the first traveling mode is determined to be unperformable;

activating the motor after starting the engine; and performing a hydraulic pressure control for applying a hydraulic pressure to the friction engagement element so that the friction engagement element shifts from the disengaged state to the engaged state after starting the engine, wherein performing the hydraulic pressure control uses a hydraulic pressure from the mechanical oil pump driven by activating the motor and a hydraulic pressure from the electric oil pump, wherein performing the hydraulic pressure control is started substantially at the same time as start of activation of the motor, and wherein the electric oil pump is activated before the mechanical oil pump is activated.

2. The method of claim 1, wherein the electric oil pump is smaller than the mechanical oil pump.

3. The method of claim 2, wherein the friction engagement element has a hydraulic chamber into which oil is introduced, and becomes in one of the engaged state and the disengaged state according to the oil introduced into the hydraulic chamber, and wherein when performing the hydraulic pressure control is started, the hydraulic chamber of the friction engagement element is filled up with the oil at least using the hydraulic pressure from the electric oil pump.

4. The method of claim 3, further comprising a step of: temporarily activating the electric oil pump before starting the engine so that at least a hydraulic system configured to supply oil to the friction engagement element is filled up with oil.

5. The method of claim 4, wherein the electric oil pump suspends the supply of oil to the friction engagement element after activation of the mechanical oil pump.

6. A method of controlling a hybrid vehicle including an engine, a motor, a starter configured to start the engine, a friction engagement element provided between the engine and the motor so as to be engageable and disengageable, a mechanical oil pump configured to be driven by the motor and supply oil to the friction engagement element, and an electric oil pump configured to supply oil to the friction engagement element, separately from the mechanical oil pump, wherein when the friction engagement element is in a disengaged state, a first traveling mode in which the hybrid vehicle travels using torque of the motor without using torque of the engine is performed, and when the friction engagement element is in an engaged state, a second traveling mode in which the hybrid vehicle travels at least using the torque of the engine is performed, the method comprising steps of:

determining whether the first traveling mode is performable during a startup of the hybrid vehicle;

starting the engine by the starter to perform the second traveling mode, when the first traveling mode is determined to be unperformable;

activating the motor after starting the engine; and performing a hydraulic pressure control for applying a hydraulic pressure to the friction engagement element so that the friction engagement element shifts from the disengaged state to the engaged state after starting the engine, and wherein the electric oil pump is activated before the mechanical oil pump is activated, and the hydraulic pressure control is performed using a hydraulic pressure from the mechanical oil pump driven by activating the motor and a hydraulic pressure from the electric oil pump.

7. The method of claim 6, wherein the electric oil pump is smaller than the mechanical oil pump.

8. The method of claim 7,
wherein the friction engagement element has a hydraulic chamber into which oil is introduced, and becomes in one of the engaged state and the disengaged state according to the oil introduced into the hydraulic chamber, and
wherein when performing the hydraulic pressure control is started, the hydraulic chamber of the friction engagement element is filled up with the oil at least using the hydraulic pressure from the electric oil pump.

9. The method of claim 8, further comprising a step of: temporarily activating the electric oil pump before starting the engine so that at least a hydraulic system configured to supply oil to the friction engagement element is filled up with oil.

10. The method of claim 9, wherein the electric oil pump suspends the supply of oil to the friction engagement element after activation of the mechanical oil pump.

11. The method of claim 1,
wherein the friction engagement element has a hydraulic chamber into which oil is introduced, and becomes in one of the engaged state and the disengaged state according to the oil introduced into the hydraulic chamber, and
wherein when performing the hydraulic pressure control is started, the hydraulic chamber of the friction engagement element is filled up with the oil at least using the hydraulic pressure from the electric oil pump.

12. The method of claim 1, further comprising a step of: temporarily activating the electric oil pump before starting the engine so that at least a hydraulic system configured to supply oil to the friction engagement element is filled up with oil.

13. The method of claim 1, wherein the electric oil pump suspends the supply of oil to the friction engagement element after activation of the mechanical oil pump.

14. The method of claim 6,
wherein the friction engagement element has a hydraulic chamber into which oil is introduced, and becomes in one of the engaged state and the disengaged state according to the oil introduced into the hydraulic chamber, and
wherein when performing the hydraulic pressure control is started, the hydraulic chamber of the friction engagement element is filled up with the oil at least using the hydraulic pressure from the electric oil pump.

15. The method of claim 14, further comprising a step of: temporarily activating the electric oil pump before starting the engine so that at least a hydraulic system configured to supply oil to the friction engagement element is filled up with oil.

16. The method of claim 6, further comprising a step of: temporarily activating the electric oil pump before starting the engine so that at least a hydraulic system configured to supply oil to the friction engagement element is filled up with oil.

17. The method of claim 6, wherein the electric oil pump suspends the supply of oil to the friction engagement element after activation of the mechanical oil pump.

18. A control system for a hybrid vehicle, comprising:
an engine;
a motor;
a starter configured to start the engine;
a friction engagement element provided between the engine and the motor so as to be engageable and disengageable;
a mechanical oil pump configured to be driven by the motor and supply oil to the friction engagement element;
an electric oil pump configured to supply oil to the friction engagement element, separately from the mechanical oil pump; and
a control device that controls the engine, the starter, the motor, and the friction engagement element, the control device being configured to:
when the friction engagement element is in a disengaged state, perform a first traveling mode in which the hybrid vehicle travels using torque of the motor without using torque of the engine;
when the friction engagement element is in an engaged state, perform a second traveling mode in which the hybrid vehicle travels at least using the torque of the engine;
determine whether the first traveling mode is performable during a startup of the hybrid vehicle;

start the engine by the starter to perform the second traveling mode, when the first traveling mode is determined to be unperformable;

activate the motor after the startup of the engine;

perform a hydraulic pressure control for applying a hydraulic pressure to the friction engagement element so that the friction engagement element shifts from the disengaged state to the engaged state after startup of the engine; and perform the hydraulic pressure control using a hydraulic pressure from the mechanical oil pump driven by activation of the motor and a hydraulic pressure from the electric oil pump, wherein the electric oil pump is activated before the mechanical oil pump is activated.

* * * * *